April 26, 1960     R. E. GUNTHER     2,933,816
MICROMETER CALIPERS
Filed May 23, 1957
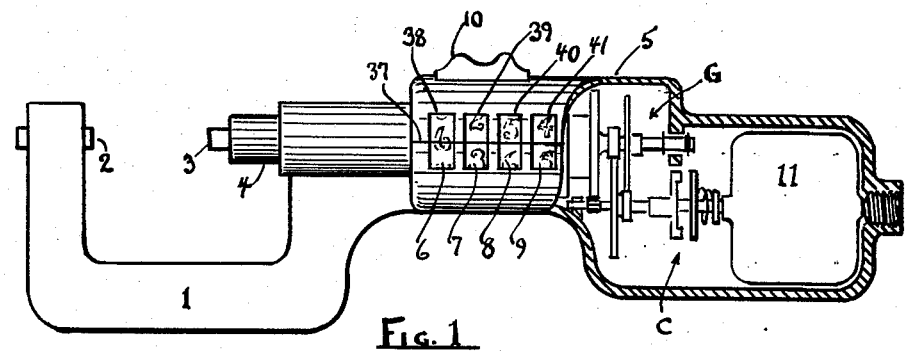
Fig. 1
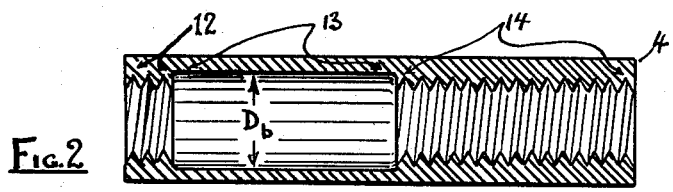 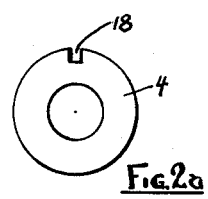
Fig. 2     Fig. 2a
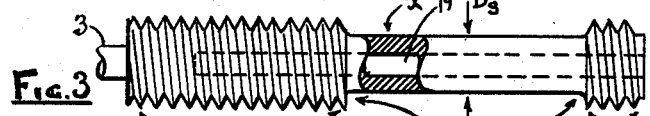 
Fig. 3     Fig. 3a
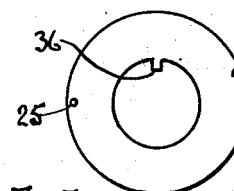 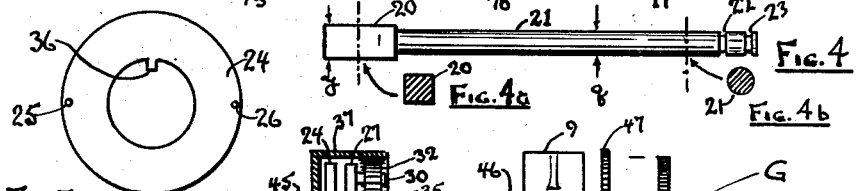
Fig. 4, Fig. 4a, Fig. 4b
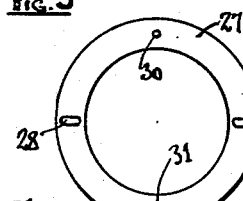
Fig. 5
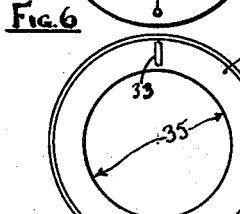
Fig. 6
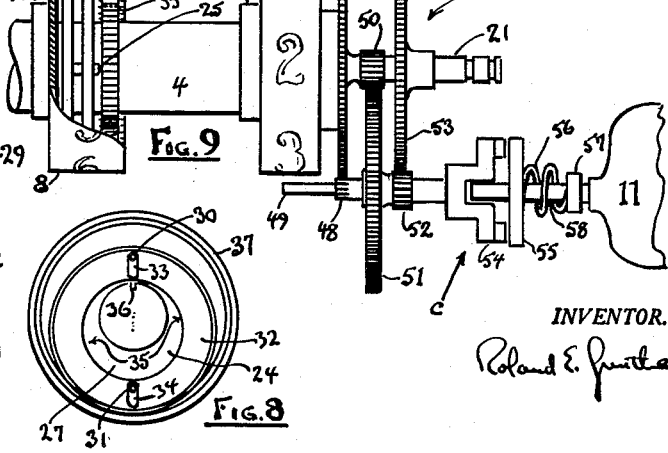
Fig. 7, Fig. 8, Fig. 9
INVENTOR.
Roland E. Gunther

United States Patent Office 2,933,816
Patented Apr. 26, 1960

2,933,816

MICROMETER CALIPERS

Roland E. Gunther, Princeton Junction, N.J.

Application May 23, 1957, Serial No. 661,106

10 Claims. (Cl. 33—164)

The micrometer calipers that are in widespread use today are hand operated both as to the manipulation of the calipers with respect to the object being measured, and the adjustment of the calipers to obtain a setting from which a reading can be taken. The reading itself is commonly taken from two or even three separate indices, some of which are not very easily read. The fine thread used on a micrometer screw makes it necessary to turn the thimble through a great many turns when taking alternate measurements of widely divergent magnitudes, and doing this by hand is very time consuming.

It is an object of this invention to provide a means whereby measurements may be made of calipers with great ease and rapidity.

It is a further object of this invention to provide a micrometer caliper means in which readout of dimensions is simply possible in one single reading.

It is also an object of this invention to provide a micrometer caliper means in which frictional loading is constant throughout the entire measuring range of the instrument so that the slip-over clutch mechanism in the spindle drive has an unvarying effect on the final spindle pressure, regardless of the intervening drive mechanism's friction.

It is a further object to provide a micrometer caliper means that can be electrically driven.

The manner in which these and other objects are realized is delineated in the following specification and the accompanying drawings.

Figure 1 shows a side view of the calipers which are the object of this invention, with part of the housing in cut-away view to permit indication of the position of some of the internal parts.

Figure 2 is a sectional view of a caliper barrel to show thread configuration. Fig. 2a is an end view of a caliper barrel.

Figure 3 shows a side view of a spindle, with graphic indications of the interior construction. Fig. 3a shows an end view of such a spindle.

Figure 4 shows a side view of a spindle drive rod, with Sub-figures 4a and 4b showing the sectional construction of such a drive rod at two separate planes.

Figures 5, 6 and 7 show parts of an epicyclic counting mechanism such as is employed in the calipers, with Fig. 5 indicating a keyed motion limiting ring member, Fig. 6 a slotted restricted motion ring, and Fig. 7 a slotted epicyclic ring gear.

Figure 8 shows a composite view of a set of epicyclic gear components applied in the caliper counting mechanism.

Figure 9 shows a portion of a caliper drive and turns indicating mechanism such as is employed in this invention.

In the drawings Figure 1 shows a side view of the device, with a portion cut away. In Figure 1 is shown a frame 1 in the conventional U-shape, with an anvil 2 as in common micrometer calipers. The frame 1 attaches to a housing 5 and to a spindle barrel 4 partially within and extending from the housing 5. In the housing 5 and partially visible through windows 38, 39, 40, 41 in the housing are drum type counter dials 6, 7, 8, 9. The cutaway portion of the housing 5 exposes to view a gear group indicated by the letter G, a clutch mechanism shown by the letter C and a motor 11. Externally mounted on the housing 5 is also shown a switch 10. A centerline 37 is drawn across the windows 37, 38, 39, 40.

Figure 2 of the drawing depicts a lateral cross-section through the spindle barrel 4. Fig. 2a shows an end view of spindle barrel 4 taken from the heel end. In Figure 2 is shown an internal micrometer thread, interrupted so that it consists of a short threaded portion 12 and a longer threaded portion 14. Spaced between the threaded portions 12 and 14 is an unthreaded portion 13 whose linear dimension is greater than the linear measuring capacity of the micrometer caliper device proper. The inside diameter $D_b$ of the unthreaded portion 13 is greater than the root diameter of the threaded portions 12 and 14. The spindle barrel 4 has another feature which is shown in Figure 2a, namely a longitudinal keyway 18.

Figure 3 shows the threaded body of spindle 3. As shown in this figure, the spindle 3 also has interrupted threading. A long externally threaded portion 15 is shown and a short 17 is also shown, between which is an unthreaded section 16 of an external diameter indicated at $D_s$ which is less than the root diameter of the threaded sections 15 and 17. A cut away portion X in the unthreaded portion 16 of the spindle 3 shows the spindle to contain a square broached hole 19, the extent of which is further indicated by dashed lines. Figure 3a shows an end view of spindle 3 of Figure 3 as seen from the right, and shows the square hole 19 and the dimension of the hole indicated by the letter z.

Figure 4 shows a spindle drive shaft 21. The drive shaft 21 has a round cross-section as indicated, Sub-figure 4b. One end of the spindle drive shaft 21 has an enlargement in the form of a plug 20 whose cross-section is square as indicated in Sub-figure 4a, and its dimension is indicated by the letter y. A pair of circular slots is turned into the end of drive shaft 21 opposite the plug 20 to permit insertion of end-play limiting retaining rings not shown.

Figure 5 shows an epicyclic gear system motion limiting ring 24. The ring 24 has a large central opening into which extends a key projection 36. Horizontally opposed and projecting toward the viewer in Figure 5 on the ring 24 are two guide pins 25, 26.

Figure 6 shows a second motion limiting ring 27 having slots 28, 29 corresponding to and interactable with pins 25, 26 respectively of ring 24 of Figure 5. In Figure 6 is also shown a pair of guide pins fastened to ring 27, and vertically opposed on ring 27, bearing the number designations 30, 31.

Figure 7 shows an inner gear of an epicyclic system, in ring form 32. Gear 32 is externally toothed in conventional fashion and in addition is provided with a pair of vertical slots 33, 34 corresponding to and interactable with guide pins 30, 31 respectively of ring 27 shown in Figure 6. Gear 32 has a large hole 35.

Figure 8 shows an epicyclic gear system as used in the preferred form of the invention as a counting mechanism, which by responding to the revolutions through which the micrometer screw is turned provides a readout means of the caliper measurement. In Figure 8 is shown an outer epicyclic gear 37 with conventional internal teeth, and the same gear embodies a drum type dial such as the dials 6, 7, 8 of Figure 1. In Figure 8 within the outer gear 37 is inner gear 32 such as was shown in Figure 7. Visible through slots 33, 34 of inner gear 32 in Figure 8 are guide pins 30, 31 of a ring 27 behind gear 32 and obscured from view in this figure. Visible to some extent through hole 35 in gear 32 is the first motion limiting ring 24 such as was described in Figure 5, with key 36 visible.

Figure 9 shows a portion of the motor 11 mentioned under Figure 1, as well as the drive gearing G and the clutch C. In Figure 9 is a motor shaft 58 surrounded by a compression spring 56 applying between a flange 57 on the shaft 58 and a driving member 55 of clutch C. Opposing and interacting with driving clutch member 55 is a driven clutch member 54 carried and rotatable with a stub shaft 49. Shaft 49 has affixed upon it a drive gear 48 which comprises the primary member of two gear systems, one of which is the group G, the other of which is made up of an epicyclic counter set of which dial 9 shown is the first member and dial 8 shown, the second. Drive gear 48 meshes with a larger gear 47, gear 47 being concentrically attached to drum dial 9 on one side and spur gear 50 on the other side. Spur gear 50 meshes with a larger gear 51, and gear 51 together with a smaller gear 52 form a cluster that is free to rotate on stub shaft 49. Gear 52 meshes with a larger gear 53 that represents the final spindle drive gear and is fastened to the spindle drive shaft 21.

The first units of the epicyclic counter shown in Figure 9 are the drum dial 9 an eccentric 46 shown to be mounted on the left side of dial 9 and capable of being fitted into the hole 35 of inner gear 32. A portion of the outer gear 37 and the dial face 8 is cut away in this view to expose the epicyclic gear parts. Pin 30 on ring 27 is shown extending through gear 32 in one of the slots 33, 34 not visible in this view. One of the pins 25 on ring 24 is shown projecting through one of the slots 28, 29 of ring 27. An eccentric 45 mounted on the left side of dial 8 is shown, by means of which the next dial to the left and its epicyclic gearing, not shown, is driven.

The calipers, which are the object of this invention, are used as in conventional manner insofar as the object to be measured is placed between the anvil 2 and the end of the spindle 3. The spindle 3 is then screwed up against the object by means of the internal threading within the barrel 4 and the external threading on the spindle 3.

Referring to Figures 2 and 3, the thread system within the barrel 4 and on the spindle 3 are such that the short internally threaded section 12 in the barrel 4 engages a portion equal in length of the longer externally threaded section 15 of the spindle 3, and the short threaded section of the spindle 3 engages a portion equal to its length of the longer threaded section 14 of the barrel 4. In this manner the total amount of threading in contact between the spindle and the barrel remains constant, regardless of how far in or out the spindle happens to be, within those limits for which the calipers are designed to measure. In this way too the friction in the drive system due to surface contact of the threading remains unaffected by the position of the measuring spindle.

The spindle 3 as described above is moved toward or away from the anvil 2 by being turned within the barrel 4. This turning action is provided by means of the spindle drive shaft 21 shown in Figure 4. The dimension y of the square plug end of the spindle drive shaft is so chosen with respect to the internal dimension z of the square hole within the spindle that a freely sliding fit between the two results. The spindle drive shaft mounts non-rotatably a gear 53 through which rotatory motion can be imposed upon the spindle.

The spindle drive gear 53 is a part of the gear system G shown in Figures 1 and 9. The gear system G is driven through a low capacity clutch system C by a reversible electric motor 11, which in turn is connected to a suitable electric supply source, not shown, via switch 10. Switch 10 is of the reversing type and can cause the motor 11 to rotate in either direction at the operator's will.

Referring to Fig. 9, rotation of the motor shaft causes the spring loaded driving member 55 of the clutch C to turn driven clutch member 54 and its attached shaft 49 and drive gear 48. Gear 48 meshes with and drives gear 47 at a reduced rate, then through reduction gear sets 50—51 and 52—53 the spindle drive shaft is given rotation. When the spindle 3 contacts an object held between it and the anvil 2, the limited capacity of the clutch C causes it to slip and stop the gears.

As gear 48, driven by the motor 11 through the clutch as described, revolves it also brings drum dial 9 into revolution, being attached thereto. The drum dial 9 carries an eccentric 46 which drives the epicyclic counter system in drum 8; drum 8 in turn has an eccentric that drives the next drum 7 and the same applies to drum 7 and subsequent drums up to the last one.

The epicyclic gear system used in the preferred form of this invention differs from most counter systems in that it provides constant and non-pulsating carryover of motion from one counter to each next one of higher denomination. The ring 24 has a key 36 that engages the keyway 18 on the barrel 4, which prevents it from revolving. The guide pins 25, 26 and the corresponding slots 28, 29 in disc 27 permit only horizontal motion in ring 27. The guide pins 30, 31 of ring 27 and the corresponding slots 33, 34 of inner gear 32 permit gear 32 to undergo lateral and vertical motion but not to rotate, and the transfer of motion to the outer gear is smooth and linear with respect to the input. In this manner the load imposed upon the drive gearing, and most of all upon the clutch is maintained at a constant value, so that slippage when it comes is due to the same pressure of spindle 3 against the work piece at all times.

The amount of reduction brought about in the gearing G between the gear 47 and its attached dial is kept consonant with the distance the spindle is moved forward for each revolution of the dial. With a micrometer thread pitch of 40 threads per inch one revolution extends or retracts the spindle 0.025 inch. By making both gear pairs reduce by the ratio of 1:5 the dial 9 will revolve once for each 0.001 inch, and by providing it with ten digits equally spaced it can be made to read in ten thousandths of an inch. In a micrometer caliper of one inch capacity then this invention provides reading to a ten thousandth of an inch on one line, in a single final group of numbers in which no interpolation is needed, no partial readings must be carried, no verniers need be scrutinized.

I claim:

1. In a micrometer caliper the combination of a rigid frame, a normally fixed reference means, said fixed reference means associated with said frame, a movable reference means, said movable reference means comprising a spindle, said spindle having a highly uniform non-circular internal bore, a pair of precision thread means, one of said thread means associated with said frame and the other of said thread means associated with said spindle, a spindle drive rod, said spindle drive rod of substantially smaller section than the said bore of said spindle, said spindle drive rod axially aligned with and extending partially into said bore of said spindle, a boss, said boss having substantially an external contour the same as the internal contour of said bore in said spindle, and said boss so dimensioned with respect to said bore as to yield a sliding fit between said boss and said bore, said boss affixed to the end of said spindle drive rod projecting into said spindle bore, that end of said spindle drive rod extending from said spindle bore being rotatably held in said frame, a slip clutch, a motor, said motor applying rotatably to said spindle drive rod through the medium of said slip clutch, a turns counting means, said turns counting means applying between the elements of said thread pair and thereby between said frame and said spindle, said turns counting means indicative of linear progression between the elements of said thread pair by calibration with respect to the pitch of said mating pair of thread means, said thread means axially aligned with said fixed reference means, said turns counting means indicative also by virtue of said axial alignment of linear movement of said spindle with respect to said fixed reference means, a switching means, said switching means applying between said motor and any convenient source of power.

2. In a micrometer caliper the construction of claim 1, wherein the said turns counting means comprises an epicyclic gear counter of the non-pulsating type.

3. In a micrometer caliper the construction of claim 1, wherein the said pair of mating thread means comprise two corresponding threaded elements, each of said threaded elements having a portion of threading cut away, said cut away portion of threading so disposed as to leave on each said element a short threaded portion and a long threaded portion, the said short threaded portion of each said element of said mating thread means engaging the said long threaded portion of the opposing said element of said pair of thread means.

4. In a micrometer caliper the construction of claim 3, wherein the said turns counting means comprises an epicyclic gear counter of the non-pulsating type.

5. In a micrometer caliper the combination of a rigid frame, a normally fixed reference means, said fixed reference means associated with said frame, a movable reference means, said movable reference means comprising a spindle, said spindle having a highly uniform non-circular internal bore, a pair of precision thread means, one of said pair of thread means associated with said frame, the other of said pair of thread means associated with said spindle, a spindle drive rod, said spindle drive rod of substantially smaller section than the said bore of said spindle, said spindle drive rod axially aligned with and extending partially into said bore of said spindle, said spindle axially in line with said fixed reference means, said mating pair of thread means being also axially aligned with said fixed reference means, a boss, said boss having substantially an external contour the same as the internal contour of said bore in said spindle, said boss so dimensioned with respect to said bore as to yield a sliding fit between said boss and said bore, said boss affixed to that portion of said spindle drive rod extending into said spindle bore, that end of said spindle drive rod opposing said spindle being rotatably held in said frame, a slip clutch, the output of said slip clutch applying rotatably to said spindle drive rod, a turns counting means, said turns counting means applying between the elements of said mating pair of thread means, and thereby between said frame and said spindle, said turns counting means indicative of linear progression between said spindle and said frame associated fixed reference means by calibration with respect to the pitch of said mating pair of thread means, the input of said slip clutch being the receptor for any convenient source of external rotational energy.

6. In a micrometer caliper the construction of claim 5, wherein the said turns counting means comprises an epicyclic gear counter of the non-pulsating type.

7. In a micrometer caliper the construction of claim 5, wherein the said pair of mating thread means comprises two elements, each of said elements having in sequence a short threaded portion, an unthreaded portion and a long threaded portion, said unthreaded portion being undercut below the root of said threaded portions, the said pair of thread means mating and in correspondence with one another with the said short threaded portion of each said element engaging the said long threaded portion of the opposing of said pair of thread means.

8. In a micrometer caliper the combination of a rigid frame, a normally fixed reference means, said fixed reference means associated with said frame, a movable reference means, said movable reference means spatially opposed to said fixed reference means, a pair of mating precision thread means, one of said pair of thread means affixed to said frame, the other of said thread means associated with said movable reference means, said pair of thread means axially in line with said fixed reference means, said mating thread means comprising two elements, each of said elements having threading interrupted by an unthreaded portion, said unthreaded portion so disposed that each said element has a short threaded portion and a long threaded portion, the said unthreaded portion of each said element being undercut and featuring a land lower than the root of the thread on the said threaded portions bracketing each said unthreaded portion, the said pair of thread means mating and in correspondence with one another with the said short threaded portion of each said thread means engaging the said long threaded portion of the opposing of said thread means throughout the capacity of said calipers, a motor, a limited capacity clutch means, the power transfer capacity of said clutch means being less than the power producing capabilities of said motor, the output of said motor rotatably applying to the input of said clutch means, the output of said clutch means applying in turn to the said movable reference means thereby rendering said movable reference means capable of progression in line with said fixed reference means by virtue of the correspondence of said associated mating pair of thread means, a turns counting means said turns counting means applying between the elements of said pair of mating thread means, said turns counting means calibrated with respect to the pitch of said pair of mating thread means and thereby indicative of linear movement of said movable reference means with respect to said fixed reference means, and a switching means, said switching means applying between said motor and any convenient source of external power.

9. In a micrometer caliper the construction of claim 8, wherein the said turns counting means comprises an epicyclic gear counter of the non-pulsating type.

10. In a micrometer caliper the combination of a rigid frame, a normally fixed reference means, said fixed reference means associated with said frame, a movable reference means, said movable reference means spatially opposed to said fixed reference means, a pair of mating precision thread means, said precision thread means axially aligned with said fixed reference means, one of said pair of thread means affixed to said frame, the other of said thread means associated with said movable reference means, said mating thread means comprising two elements, each of said elements having sequentially a short threaded portion, an unthreaded portion, and a long threaded portion, said unthreaded portion being undercut lower than the root of said threaded portion, the said pair of thread means mating and in correspondence with one another with the said short threaded portion of each said element of said thread means engaging the said long threaded portion of the opposing of said pair of thread means, a slip clutch, the output of said slip clutch applying rotatably to said movable reference means associated element of said thread pair, said movable reference means thereby capable of progression in linear fashion by virtue of the correspondence of said mating pair of thread means, a turns counting means, said turns counting means applying between the elements of said pair of mating thread means and responsive to relative rotation of one of said elements of said pair of thread means with respect to the other element of said pair of thread means, said turns counting means comprising an epicyclic gear counter of the non-pulsating type, said turns counting means calibrated with respect to the pitch of said mating thread means as to be indicative of linear movement of said movable reference means in line with said fixed reference means, the input of said slip clutch comprising the receptor for any convenient external source of rotational energy.

References Cited in the file of this patent

UNITED STATES PATENTS

| | | |
|---|---|---|
| 1,107,202 | Savage | Aug. 11, 1914 |
| 1,389,028 | Colburn | Aug. 30, 1921 |
| 1,444,565 | Smith | Feb. 6, 1923 |
| 1,615,440 | Cottrel | Jan. 25, 1927 |
| 2,624,122 | Knobel | Jan. 6, 1953 |
| 2,709,305 | Meyer | May 31, 1955 |